(12) United States Patent
Sebire

(10) Patent No.: US 7,145,896 B1
(45) Date of Patent: Dec. 5, 2006

(54) METHOD FOR TRANSMITTING DATA ON A PACKET DATA CHANNEL

(75) Inventor: Benoist Sebire, Helsinki (FI)

(73) Assignee: Nokia Corporation, Espoo (FI)

( * ) Notice: Subject to any disclaimer, the term of this patent is extended or adjusted under 35 U.S.C. 154(b) by 421 days.

(21) Appl. No.: 09/689,447

(22) Filed: Oct. 12, 2000

(30) Foreign Application Priority Data

Oct. 15, 1999 (FI) .................................. 19992232

(51) Int. Cl.
*H04J 3/24* (2006.01)
*H04Q 7/38* (2006.01)

(52) U.S. Cl. ...................... 370/349; 370/329; 370/477

(58) Field of Classification Search ..... 370/310–310.2, 370/312, 313, 314, 328, 329, 336, 337, 347, 370/351, 375–377, 389, 392, 394, 395.1, 370/442, 474, 498
See application file for complete search history.

(56) References Cited

U.S. PATENT DOCUMENTS

| | | | | |
|---|---|---|---|---|
| 5,475,681 A * | 12/1995 | White et al. ................. | 370/349 |
| 5,517,505 A * | 5/1996 | Buchholz et al. ........... | 370/350 |
| 5,606,561 A * | 2/1997 | Scheibel et al. ............ | 370/347 |
| 5,648,967 A | 7/1997 | Schulz ....................... | 370/328 |
| 5,742,592 A * | 4/1998 | Scholefield et al. ........ | 370/329 |
| 5,751,704 A | 5/1998 | Kostic et al. ............... | 370/335 |
| 5,812,547 A * | 9/1998 | Benzimra et al. .......... | 370/350 |
| 5,931,916 A * | 8/1999 | Barker et al. ............... | 709/239 |
| 6,208,663 B1* | 3/2001 | Schramm et al. ........... | 370/465 |
| 6,212,202 B1* | 4/2001 | Radimirsch et al. ........ | 370/473 |
| 6,259,744 B1* | 7/2001 | Lee et al. .................... | 375/264 |
| 6,438,115 B1* | 8/2002 | Mazur et al. ................ | 370/330 |
| 6,496,551 B1* | 12/2002 | Dam et al. ................... | 375/347 |
| 6,501,745 B1* | 12/2002 | Turina et al. ................ | 370/337 |
| 6,584,084 B1* | 6/2003 | Barany et al. ............... | 370/329 |
| 6,647,000 B1* | 11/2003 | Persson et al. .............. | 370/330 |
| 6,671,287 B1* | 12/2003 | Huttunen et al. ............ | 370/469 |
| 6,707,807 B1* | 3/2004 | Menzel ........................ | 370/337 |
| 6,772,112 B1* | 8/2004 | Ejzak .......................... | 704/201 |
| 6,791,944 B1* | 9/2004 | Demetrescu et al. ........ | 370/235 |
| 6,865,233 B1* | 3/2005 | Eriksson et al. ............ | 375/261 |
| 2001/0056560 A1* | 12/2001 | Khan et al. .................. | 714/746 |

FOREIGN PATENT DOCUMENTS

| | | |
|---|---|---|
| EP | 0 891 060 A2 | 1/1999 |
| WO | WO 99/14963 | 3/1999 |
| WO | WO 99/16264 | 4/1999 |

OTHER PUBLICATIONS

Digital Cellular Communications System, ESTI,EN 301 349 v 6.3.1, 1997, pp. 1-79.
An Adaptive Radio Link Protocol with Enhanced Data Rates for GSM Evolution, Robert Van Nobelen and Nambi Seshadri, IEEE Personal Communications, Feb. 1999, pp. 54-64.

* cited by examiner

*Primary Examiner*—Hassan Kizou
*Assistant Examiner*—Ahmed Elallam
(74) *Attorney, Agent, or Firm*—Perman & Green, LLP

(57) ABSTRACT

Method for transmitting data on a packet data channel, where the packet data channel is formed by sequential radio bursts in certain time slots in a certain sequence of radio frames, data is transmitted in data blocks, a packet data channel is used by a number of packet data connections and an identifier in each data block is used to indicate the connection to which the data block is related. Furthermore, the number of radio bursts, using which a data block is transmitted, is selected from a certain set of values, which set contains at least two values. A mobile station, an arrangement and a network element are also presented.

27 Claims, 9 Drawing Sheets

FIG. 7a

700

Figure 1:
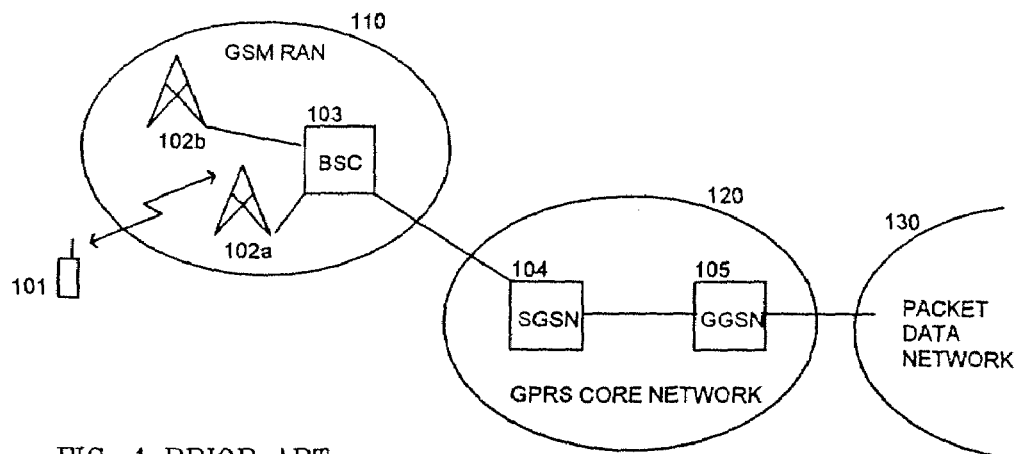

| 701 MAC header | 702 USF | 703 | RLC header (TFI1) + data 1/2 |
| | | 704 | RLC header (TFI1) + data 2/2 |
| | | 705 | RLC header (TFI2) + data 1/2 |
| | | 706 | RLC header (TFI2) + data 2/2 |

FIG. 7b

710

| 711 MAC header | 702 USF | 751 Bld1 = 1 | 752 Bld2 = 2 | 753 Bld3 = 2 | 754 Bld4 = 1 | 713 | RLC header (TFI3) + data 1/1 |
| | | | | | | 714 | RLC header (TFI4) + data 1/2 |
| | | | | | | 715 | RLC header (TFI4) + data 2/2 |
| | | | | | | 716 | RLC header (TFI5) + data 1/1 |

FIG. 7c

720

| 721 MAC header | 702 USF = 5 | 761 extUSF1 = 1 | 762 extUSF2 = 1 | 763 extUSF3 = 2 | 764 extUSF4 = 3 | 723 | RLC header (TFI6) + data 1/2 |
| | | | | | | 724 | RLC header (TFI6) + data 2/2 |
| | | | | | | 725 | RLC header (TFI7) + data 1/2 |
| | | | | | | 726 | RLC header (TFI7) + data 2/2 |

FIG. 7d

730

| 731 MAC header | 702 USF = 5 | 761 extUSF1 = 1 | 762 extUSF2 = 1 | 763 extUSF3 = 1 | 764 extUSF4 = 3 | 771 Blu1 = 1 | 772 Blu2 = 2 | 773 Blu3 = 2 | 774 Blu4 = 1 | 733 | RLC header (TFI6) + data 1/2 |
| | | | | | | | | | | 734 | RLC header (TFI6) + data 2/2 |
| | | | | | | | | | | 735 | RLC header (TFI7) + data 1/2 |
| | | | | | | | | | | 736 | RLC header (TFI7) + data 2/2 |

FIG. 7e

740

| 741 MAC header | 702 USF = 5 | 761 extUSF1 = 1 | 762 extUSF2 = 1 | 763 extUSF3 = 1 | 764 extUSF4 = 3 | 771 Blu1 = 1 | 772 Blu2 = 2 | 773 Blu3 = 2 | 774 Blu4 = 1 | 751 Bld1 = 1 | 752 Bld2 = 2 | 753 Bld3 = 2 | 754 Bld4 = 1 | 743 RLC ... (TFI3) +... 1/1 |
| | | | | | | | | | | | | | | 744 RLC ... (TFI4) +... 1/2 |
| | | | | | | | | | | | | | | 745 RLC ... (TFI4) +... 2/2 |
| | | | | | | | | | | | | | | 746 RLC ... (TFI5) +... 1/1 |

METHOD FOR TRANSMITTING DATA ON A PACKET DATA CHANNEL

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION (1) Field of the Invention

The invention relates in general to a method and an arrangement for transferring packet data in the radio access network of a cellular system. The invention relates in particular to a situation where many mobile stations share a packet data channel.

(2) Description of Related Art including information disclosed under 37 CFR 1.97 and 1.98;

Traditionally cellular systems, for example the Global System for Mobile telecommunications (GSM), have been used to transmit speech and they have implemented circuit switching. In circuit switching a certain amount of transmission resources is reserved in all the networks through which the connection goes. For new data applications there is usually need to transmit bursts of data every now and then. For this kind of data transmission circuit switching is not an efficient way to transmit data.

General Packet Radio Service (GPRS) is an example of a wireless packet switched network. It is an addition to the GSM system. Using GPRS it is possible provide a certain portion of the radio resources of the GSM radio access network for users who wish to transmit packet data. The statistical multiplexing, i.e. the fact that every user is not transmitting packets at the same time, allows a certain radio channel to be used efficiently by many users. Similarly, Enhanced Packet Radio Service (EGPRS) is a packet data system of the EDGE (Enhanced Data Rate for GSM Evolution). EDGE is an enhanced version of GSM that provides circuit switched and packet switched data transmission at a higher rate than current GSM or GPRS. EDGE and EGPRS are under specification at the priority date of this patent application.

The packet data channel, as most channels in Time Division Multiple Access (TDMA) systems, consists of a sequence of radio bursts which are sent in a certain, predetermined time slot in sequential frames. In circuit switched connections each time slot is reserved for a certain mobile station during the whole connection, so there can be, for example, some specific signaling which takes place each time a circuit-switched connection is set up or torn down. In the downlink direction the network may transmit information to various mobile stations using one packet data channel. In the uplink direction, the packet data channel is a channel shared by many mobile stations, so there has to be a method to control the uplink transmissions of the mobile stations on a packet data channel.

FIG. 1 presents a schematic diagram of a GSM radio access network (RAN) 110, which can transmit GPRS data, and GPRS core network 120 as an example of a wireless packet radio. A mobile station (MS) 101 communicates with a base station (BTS) 102a. One or more base stations, in FIG. 1 base stations 102a and 102b, are connected to a base station controller (BSC) 103. The base station controller is responsible, for example, for allocation of radio resources and for handling handovers, where a mobile station changes the base station it communicates with. The base stations and base station controllers form the GSM radio access network 110. In addition to these components, a GSM network comprises in the fixed part of the network Mobile Service Switching centers (MSC), Home Location Register (HLR) and Visitor Location Register (VLR). HLR and VLR take part in, for example, subscriber and mobility management. These are not shown in FIG. 1.

The GPRS core network comprises GPRS supporting nodes (GSN). Of these nodes, the one which is on the edge towards a data network 130, for example the Internet, is called Gateway GPRS supporting node (GGSN). In FIG. 1, a GGSN 105 is presented. Data packets may run through many GSNs, which act as routers. A mobile station, which is the endpoint of the data connection, is reachable through one base station controller and the GSN connected to this base station controller is called Serving GPRS support node (SGSN). In FIG. 1, the mobile station 101 is reachable via the BSC 103 and the GSN connected to this BSC is SGSN 104.

User data is transferred transparently between the MS and the external data networks with a method known as encapsulation and tunneling: data packets are equipped with GPRS-specific protocol information and transferred between the MS and GGSN. In order to access the GPRS services, a MS first makes its presence known to the network by performing a GPRS attach. This operation establishes a logical link between the MS and the SGSN, and makes the MS available for, for example, paging via SGSN and notification of incoming GPRS data.

The SGSN is at the same hierarchical level as the MSC, keeps track of the individual MSs' location and performs security functions and access control. The Gateway GSN provides interworking with external packet-switched networks, and is connected with SGSNs via an IP-based GPRS backbone network.

Figure 2:
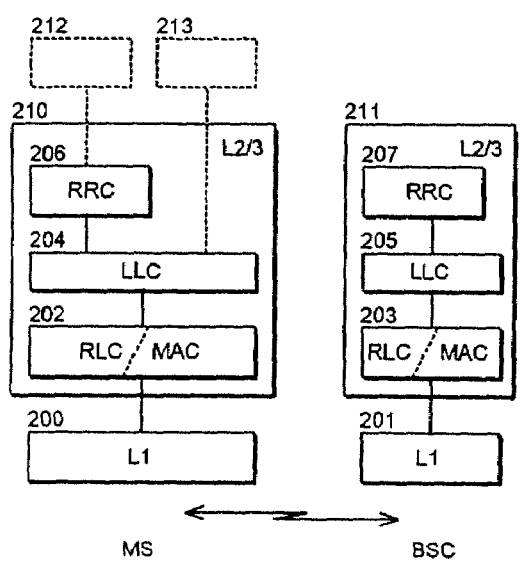

Functions applying digital data transmission protocols are usually described as a stack according to the OSI (Open Systems Interface) model, where the tasks of the various layers of the stack, as well as data transmission between the layers, are exactly defined. FIG. 2 presents the lowest protocol layers of the GSM RAN and the lowest protocol layers of a mobile station MS. The lowest protocol layer between the mobile station MS and the base station subsystem is layer 1 (L1) 200, 201, which corresponds to a physical radio connection. Above it, there is an entity 210, 211 corresponding to the layers 2 and 3 (L2/3) of a regular OSI model. The lowest sublayer in this entity is a radio link control/media access control (RLC/MAC) layer 202, 203. On top of it there is a logical link control (LLC) layer 204, 205 and the topmost sublayer in the entity 200, 201 is a radio resource control (RRC) layer 206, 207.

The mobile station MS includes also a higher-level control protocol 212, which communicates with the RRC layer 206 in order to realize control functions connected to data transmission connections. It also includes a protocol 213 for serving higher-level applications, which communicates directly with the LLC layer 204 in order to transmit such data that directly serves the user (for instance digitally encoded speech). In the mobile station of the GSM system, blocks 212 and 213 are included in a Mobility Management layer.

In GPRS, a Temporary Block Flow (TBF) is created for transferring data packets on a packet data channel. The TBF is a physical connection used by two mutually communicating Radio Resource (RR) peer entities to support the unidirectional transfer of Logical Link Control (LLC) Packet Data Units (PDU) from upper Logical Link Control (LLC) layers on physical channels for packet data. There are separate TBFs for the uplink and downlink directions, even if the connection set up by a higher protocol layer is bidirectional. Usually there is only one TBF uplink-downlink pair per mobile station.

During an uplink TBF the mobile station will organize the data to be transferred into Protocol Data Units or PDUs. These are in turn divided into smaller parts which are distributed into data blocks on the RLC layer which defines the procedures related to information transfer over the radio interface. Each RLC block will have a certain connection identifier, for example the Temporary Block Flow Identifier (TFI), corresponding to the TBF whose data it carries. During a downlink TBF a similar arrangement of successive RLC blocks is produced by the network and transmitted to the mobile station.

When the RLC blocks are transmitted over the radio interface, a MAC header is attached to the coded RLC block. Here term coding refers to channel coding. The transmitted coded data blocks are called RLC/MAC blocks. The coding adds redundancy to the data, and the aim of coding is to recover the data even if some occasional transmission errors occurs. In addition to coding, the data is usually also interleaved. This means, for example, that sequential data chunks are not sent one after other, but in some other order. This way more bursty transmission errors can be tolerated.

Figure 3:
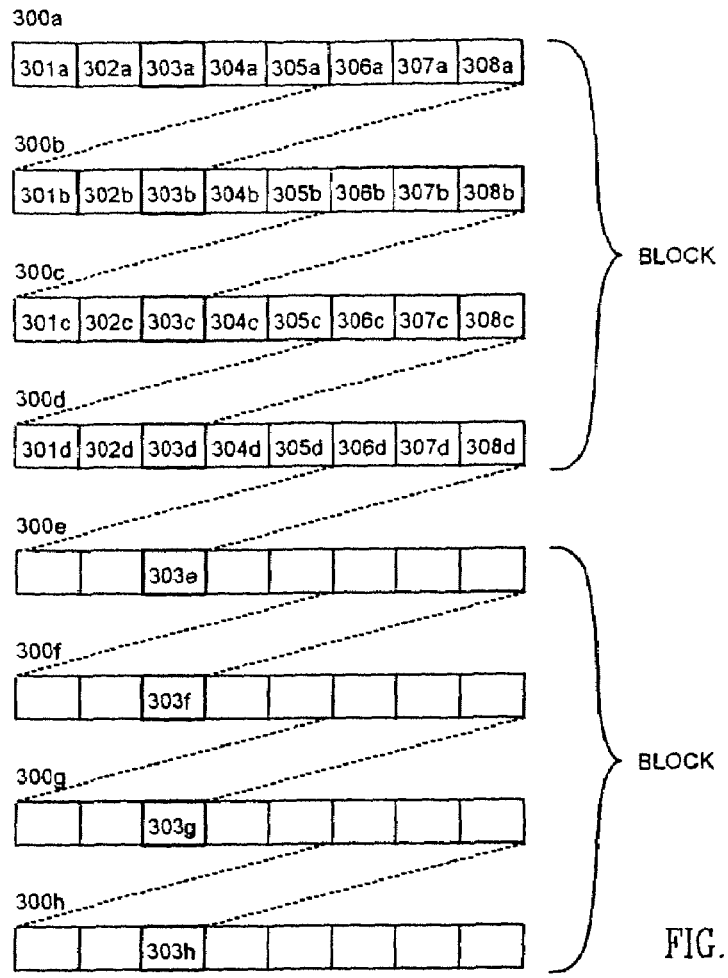

FIG. 3 illustrates schematically a packet data channel in GSM. In FIG. 3 there are eight sequential TDMA timeframes having reference numbers starting with number 300. Each timeframe consists of eight time slots; in FIG. 3 these have reference numbers starting with numbers 301–308. A channel in GSM is specified by the time slot number within a certain timeframe sequence. The timeframes of a certain sequence (i.e. related to a certain channel) can be transmitted using various frequencies.

In FIG. 3 presents a channel which uses the time slots having reference numbers starting with number 303. The data transmitted in a time slot is carried on a radio burst that lasts the duration of the time slot. In packet data channels, a number of sequential bursts in a certain time slot forms a radio block. The number of radio bursts per radio block is four in the current EGPRS specifications, where one radio block carries one coded RLC/MAC block. FIG. 3 illustrates two sequential radio blocks of a certain packet data channel. It is also possible that a packet data channel uses also other time slots than just one certain time slot in each frame.

Figure 4:
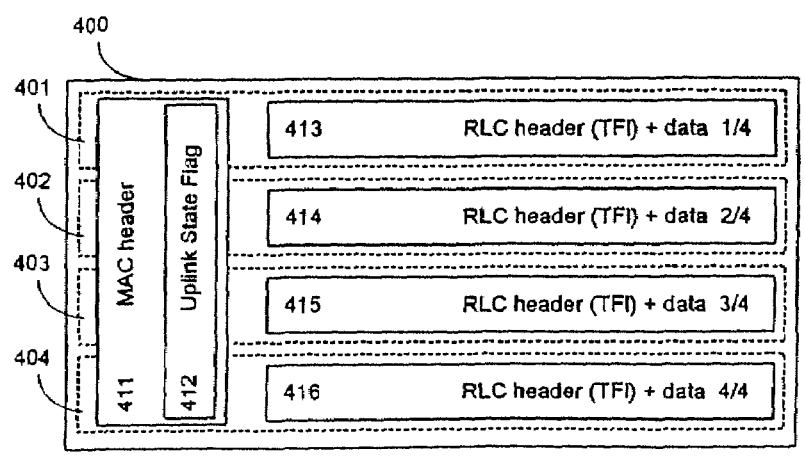

FIG. 4 shows schematically a coded and interleaved downlink RLC/MAC block 400 that is transmitted using four radio bursts. Only the relevant fields of the RLC/MAC block are presented, and the data carried by each radio burst is presented with a horizontal rectangles (rectangles 401, 402, 403 and 404). The MAC header is coded in a coding scheme that depends on the modulation that is used. The modulation may directly dictate the coding scheme of the MAC header. If there are several possible coding schemes for a certain modulation, then the coding scheme that is used must usually be somehow specified in the coded RLC/MAC block. This can be done, for example, by inserting or adding a certain bit string to the coded MAC header. The bit string is usually called Stealing Bits (SB).

The contents of the RLC block do not affect the coding of the MAC header. The coded MAC header is interleaved on four radio bursts. This is presented in FIG. 4 by placing the (coded) MAC header 411 vertically. The MAC header comprises an uplink state flag (USF) field which declares the mobile station who is allowed to use the next radio block in the uplink packet data channel. The length of the USF field is 3 bits in GPRS and EGPRS, so up to eight mobile stations can share an uplink packet data channel. The USF field 412 of the header is coded in a way that the rest of the data in the header does not affect. The coded USF is presented separately inside the MAC header 411.

The RLC block is coded using a certain coding scheme and the coded data is interleaved on that part of the radio bursts which is left over from the coded MAC header. The coded and interleaved RLC block is presented in FIG. 4 in four chunks 413, 414, 415, 416. Each of the data chunks is carried by one radio bursts.

For a mobile station to know if the data carried by a downlink RLC/MAC block is for itself, it has to first receive information carried by a radio block and then uncode the information. The coding scheme of the RLC block has to be known to the mobile station, and it can be, for example, defined when a TBF is activated. Alternatively, it can be indicated with a certain bit string in the MAC header. Once the RLC block is uncoded, the mobile station can determine the connection identifier, for example the TFI, in the RLC block. The TFI indicates to which mobile station the data is sent.

The current way of transmitting a coded RLC/MAC data block uses one radio block. A radio block allocated to a mobile station when it either transmits or receives packet data. In other words, a packet data channel can be shared between the mobile stations (or users) with block-by-block multiplexing. Term block here refers here to a radio block.

Certain real time applications, such as speech, pose very strict delay requirements. This dictates that data for these applications must be transmitted, for example, in every radio block of a packet data channel. The amount of data that the application produces, however, may be less than the amount of data that can be carried in a packet data channel reserved totally for this mobile station. It is possible to transmit the speech data in every other radio block of a certain packet data channel, but this may increase the delay too much. The current block-by-block multiplexing on a packet data channel may thus lead to inefficient use of the radio resources.

A solution to this problem has been proposed in U.S. patent application 60/144,307. A new radio burst for speech that is transmitted in EDGE using 8-PSK modulation is defined there. The suggested new radio burst lasts, for example, half the time of an ordinary radio burst. This way it is possible to fit two speech connections into one timeslot. The suggested scheme works only for 8-PSK modulation.

A further problem is that to fulfill certain quality of service constrains a certain application may have, it may be necessary to change the coding and/or interleaving properties during a packet data connection. The quality of service requirements of the application, for example, affect the parameters of the TBF. Finnish patent application FI991382 discusses in detail how and where the quality of service requirements of a packet data connection are translated to parameters of the TBF. The translation takes place most probably in and between the protocol layers 2 and 3. The patent application FI991382 does not discuss how to support the various TBFs over the radio interface on the protocol layer 1.

Finnish patent application FI990538 proposes the use of multiple TBFs per unidirectional radio connection between a mobile station and a radio access network. Each of the TBFs corresponds to different quality of service parameters. By activating a new TBF before closing the old one prevents a break in the packet data connection due to the activation of a new TBF. This method requires that it is possible to predict the quality of service requirements of a certain packet data connection.

The various quality of service requirements discussed, for example, in both above mentioned Finnish patent applications imply the use various coding and interleaving schemes. Further, different coding and interleaving schemes generally produce various amounts of coded data that needs to be transmitted per one RLC/MAC block. The amount of coded data to be transmitted is most probably not always a multiple of the data that can be transmitted using a radio block. The current way of allocating radio resources in radio blocks may thus in many situations lead to inefficient use of radio resources.

There has been a proposal on burst-by-burst multiplexing in the uplink direction. In this proposal, the number of USF fields in the MAC header is increased. Introducing more than one USF fields to the MAC header causes compatibility problems. A mobile station that is designed to look for one USF field may find the first of the USF fields in a MAC header. It cannot, however, detect the rest of the USF fields and therefore it may not notice that it is its turn to use the uplink packet data channel. The change of size of the MAC header also causes changes to the coding and inter-leaving of the downlink RLC blocks. Therefore, using this proposal, the mobile stations capable of understanding multiple USF fields in the MAC header must be multiplexed on a different packet data channel than the rest of the mobile stations.

The object of the invention is to provide a flexible method for transmitting data on a packet data channel. The data may be related to various packet data connections, mobile stations or users. The object of the invention is also to present a method for designating data transmission capacity to the mobile stations in variable sized chunks. A further object is to provide a method that can be used in uplink and/or downlink direction. The method is preferably compatible with earlier methods for multiplexing mobile stations or packet data connections on packet data channels.

The objects of the invention are achieved by selecting from set of values the number of radio bursts using which a data block is transmitted.

BRIEF SUMMARY OF THE INVENTION

Method according to the invention is a method for transmitting data on a packet data channel, where the packet data channel is formed by sequential radio bursts in certain time slots in a certain sequence of radio frames, data is transmitted in data blocks, a packet data channel is used by a number of packet data connections and an identifier in each data block is used to indicate the connection to which the data block is related, said method comprising a step of selecting the number of radio bursts, using which a data block is transmitted, from a certain set of values, which set contains at least two values.

A mobile station according to the invention comprises means for transmitting uplink data blocks, means for receiving downlink data blocks, means for detecting the number of downlink radio bursts using which an downlink data block is transmitted and means for selecting the number of uplink radio bursts using which an uplink data block is transmitted.

An arrangement according to the invention is an arrangement which comprises means for transmitting downlink data blocks, means for receiving uplink data blocks, and means for selecting the number of downlink radio bursts using which a downlink data block is transmitted.

A network element according to the invention comprises means for selecting the number of downlink radio bursts using which a downlink data block is transmitted and means for selecting the number of uplink radio bursts using which an uplink data block is transmitted.

In a method according to the invention, it is possible to choose the number of radio bursts using which a certain data block, for example a RLC block is sent. The amount of data to be transmitted can affect the choice of how many radio bursts can be allocated for each data block. On the other hand, in the presence of transmission errors it may be desirable to use a stronger coding. Stronger coding implies that a larger number of radio bursts is needed to transmit a certain data block.

One advantage of the invention is that in a method according to the invention, the number of radio bursts using which a data block is transmitted can be changed dynamically during a packet data connection. Changes in the quality of transmission over the radio interface can thus be taken into account individually for each packet data connection. Of course, the transmission capacity of the packet data channel has to be taken into account here. Similarly, connections having different quality of service requirements can use the same packet data channel, because the number of bursts per data block can be selected individually for each packet data connection. Consequently, mobile stations using a same packet data channel may each use different coding and interleaving schemes according to their own needs.

In the method according to the invention, it is also possible to select for each packet data channel in a system a different number of radio bursts that is used to transmit a data block. Packet data connection having certain quality of service requirements can then be assigned a packet data channel that most probably meets the needs. The advantage of keeping the number of radio bursts per data block constant (for at least some time) is that the number of radio bursts can be signaled to the mobile station. There is no need to add information about the number of radio bursts per data block to the coded data block or to its header. In general, it may be preferred to add some information about the coding to the header, for example, for preventing a mobile station not able to uncode a coded data packet from trying the uncoding.

Further, the transmission capacity of the packet data channel can be allocated between mobile stations in a very flexible way. Even a further advantage of the invention is that because the number of radio bursts used to transmit a data block can exceed the number of radio bursts in a radio block, it is possible to use stronger coding and interleaving methods than when a data block is transmitted using one radio block.

The method according to the invention can be used in both the uplink and the downlink direction. It is also possible to use a method according to the invention simultaneously in both uplink and downlink direction.

One of the preferred embodiments of the invention is directed to designating the uplink radio bursts to mobile stations in EGPRS is a way that is compatible with current proposals. The details are discussed in below.

The invention does not specify on which basis the selection of number of radio bursts per a certain data block is executed.

Figure 5:
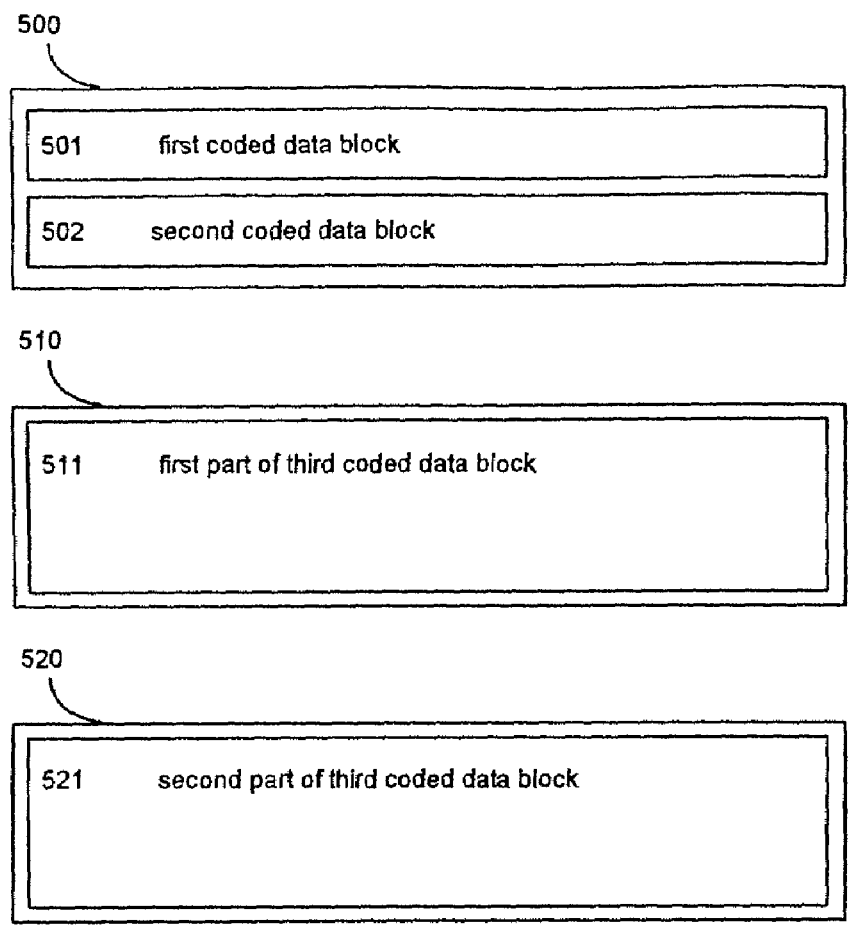
Figure 6:
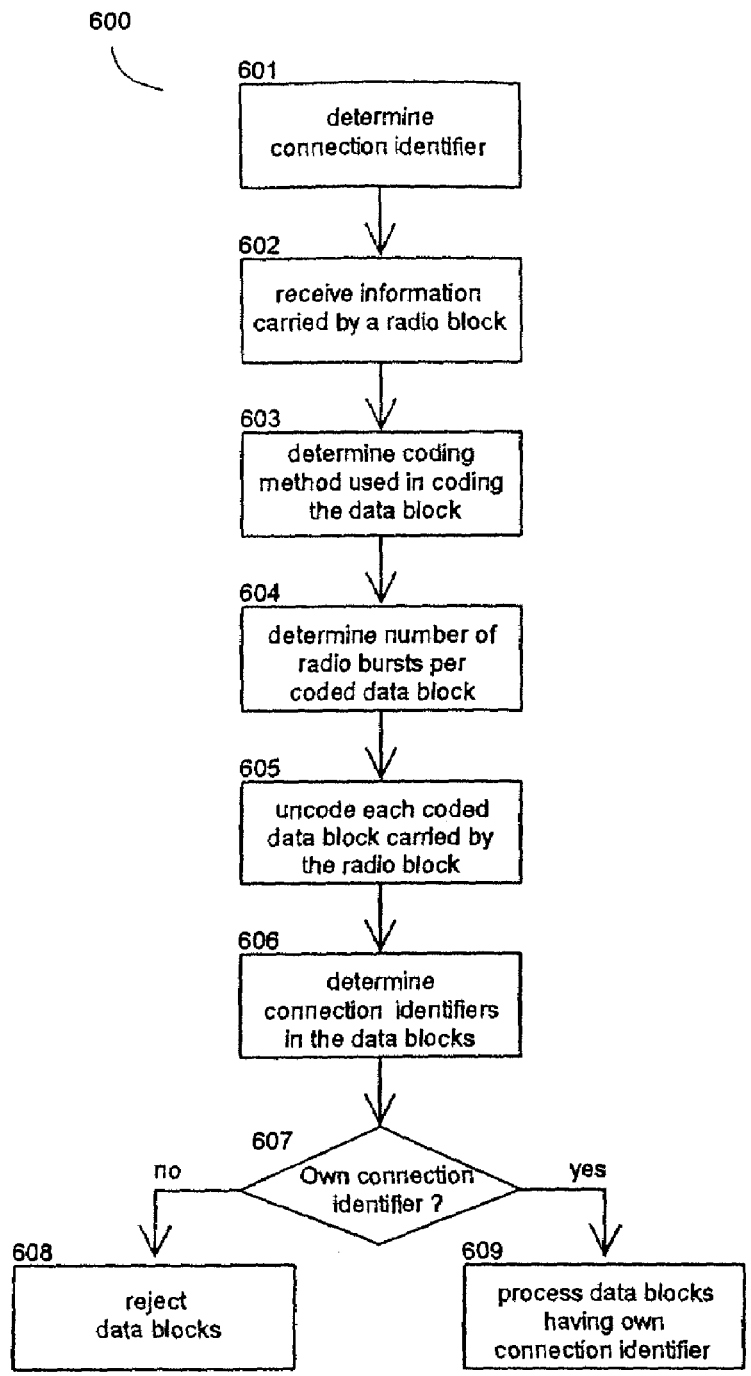
Figure 8:
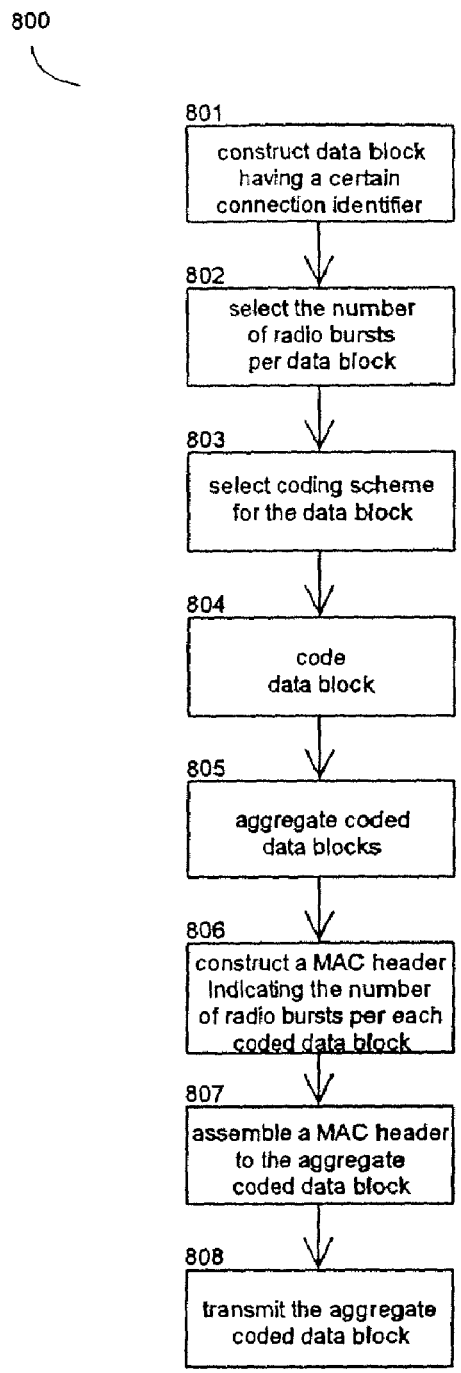
Figure 9:
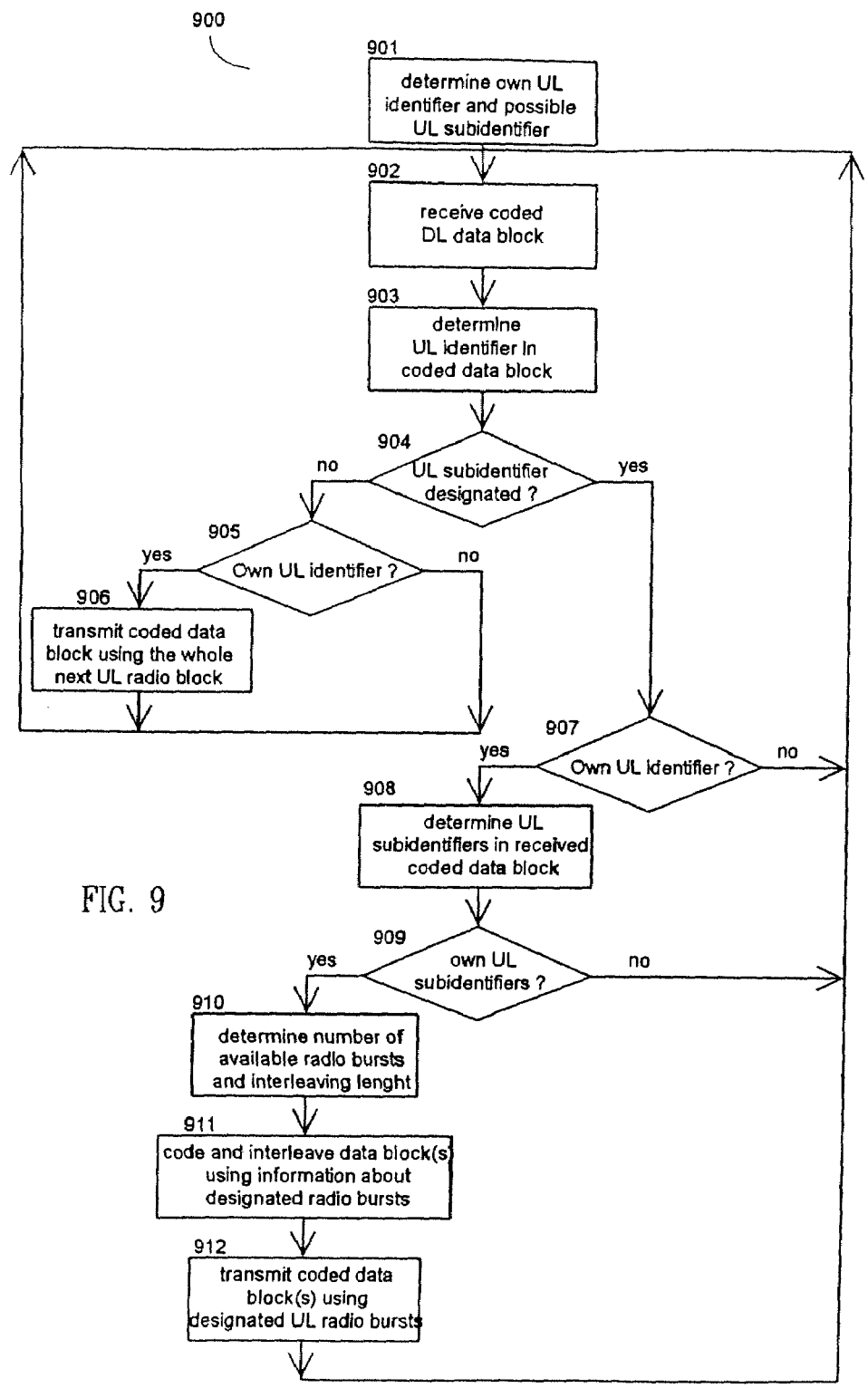
Figure 10:
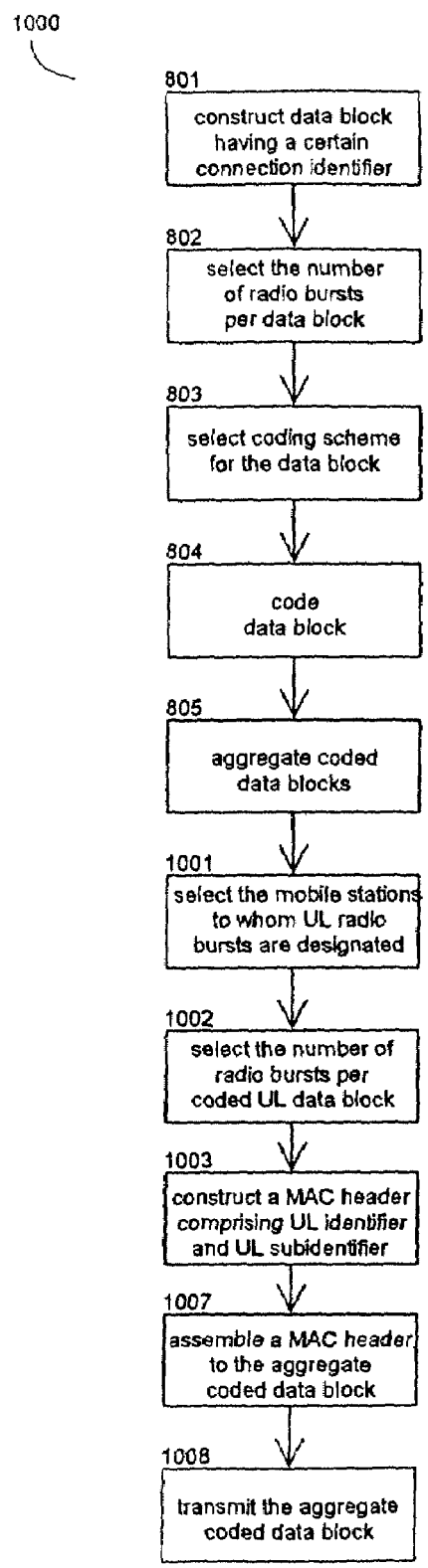
Figure 11:
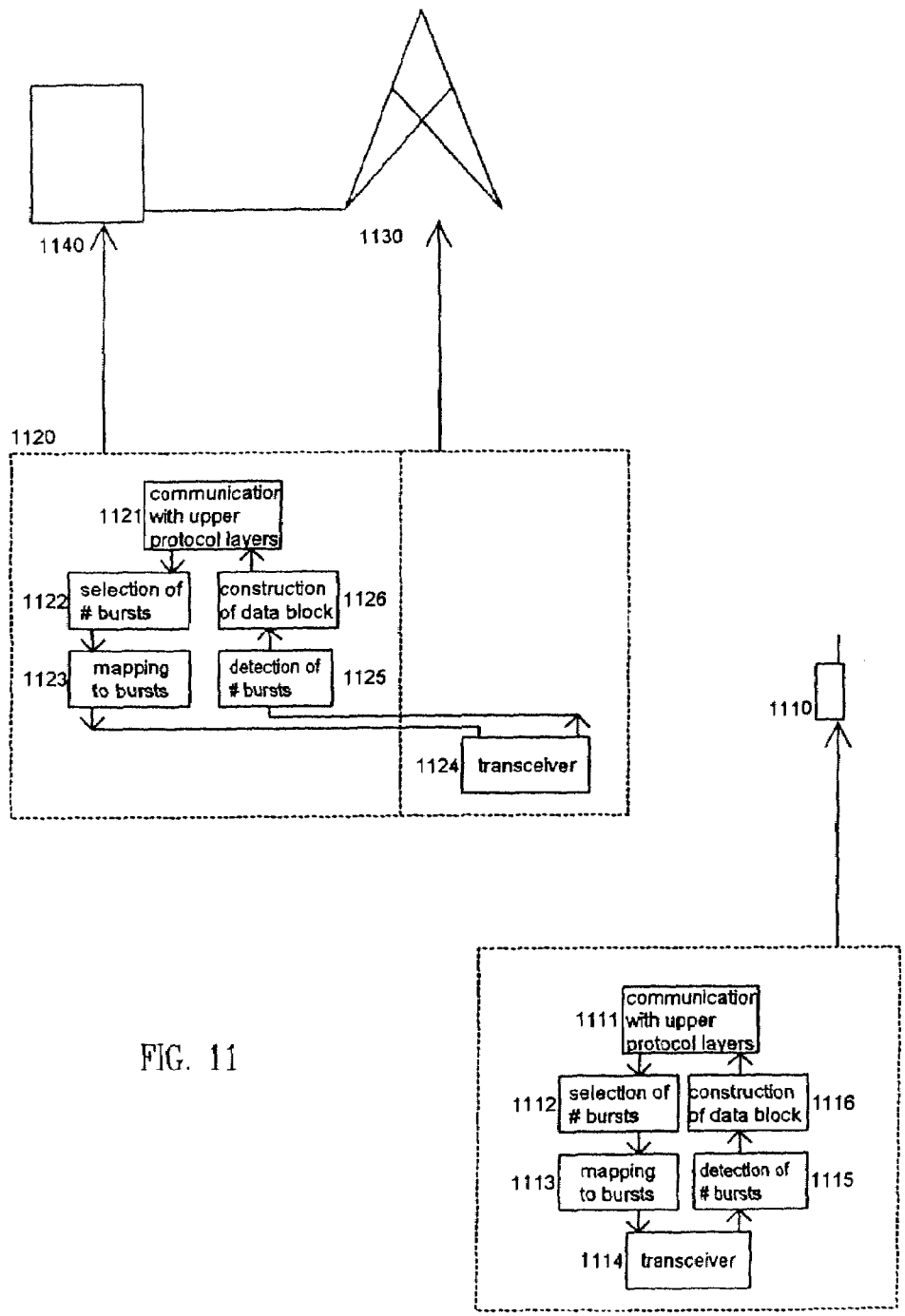

BRIEF DESCRIPTION OF THE SEVERAL VIEWS OF THE DRAWING(S);

The invention will now be described more in detail with reference to the preferred embodiments by the way of example and to the accompanying drawings where FIG. 1 shows a schematic drawing of a GSM radio access network and a GPRS core network, FIG. 2 shows the protocol stacks of a mobile station and the GSM radio access network, FIG. 3 shows a schematic drawing of a packet data channel in EGPRS, FIG. 4 shows a schematic drawing of a coded data block in EGPRS, FIG. 5 shows a schematic drawing of aggregated coded data blocks according to a first preferred embodiment of the invention, FIG. 6 shows a flowchart of method according to a second preferred embodiment of the invention for receiving data, FIG. 7 shows a schematic drawing of different aggregated coded data blocks according to the invention and their headers, FIG. 8 shows a flowchart of a method according to a second preferred embodiment of the invention for transmitting data FIG. 9 shows a flowchart of a method according to a third preferred embodiment of the invention for receiving information about the designation of uplink radio bursts, FIG. 10 shows a flowchart of a method according to a third preferred embodiment of the invention for transmitting data and FIG. 11 shows a mobile station, an arrangement and a network element according to the invention.

Above in conjunction with the description of the prior art reference was made to FIGS. 1–4. The same reference numerals are used for corresponding parts in the figures.

DETAILED DESCRIPTION OF THE INVENTION

Usually packet data blocks are coded before they are transmitted over the radio interface. The coding method affects the size of the coded data block. Consider three data blocks, for example RLC blocks that are coded using various coding methods so that first two coded blocks can be transmitted, for example, using two radio bursts and the third coded block can be transmitted, for example, using eight radio bursts. FIG. 5 shows the first two coded blocks 501 and 502, and the third coded block divided into two parts 511 and 512.

To transmit these coded blocks over the radio interface, the coded blocks are arranged to aggregated coded blocks in a method according to the first embodiment of the invention. Let us consider an example where packet data is transmitted over the radio interface using radio blocks which consists of four radio bursts. The three coded blocks, needing twelve radio bursts for transmission, are preferably arranged to three aggregated coded blocks. One of them contains the first two coded blocks (aggregated coded block 500 in FIG. 5), and two of them (510 and 520 in FIG. 5) contain each one part of the third coded block. In other words, the aggregated coded data block 500 contains two parts, each part being a complete coded data block. The aggregated coded data blocks 510 and 520 each carry one part, and the parts are partial coded data blocks.

Usually a header is added to the aggregated coded blocks. The header tells, for example, the coding of the data block(s) carried in the aggregated data block and/or the number of coded data blocks in the aggregated data block. An aggregated coded data block and its header are transmitted with the same radio bursts.

Typically, in downlink direction the network codes data block related to many mobile stations and aggregates the coded data block to aggregated data block. A downlink aggregated data block may thus carry coded data blocks to many mobile stations. The header is usually transmitted using all data bursts used to transmit the aggregated coded data block.

In uplink direction each mobile station typically codes the data blocks it intends to send. The network may control the arrangement of the coded data blocks to aggregated coded data blocks, for example, by designating to each mobile station a certain number of radio bursts in the next uplink radio block. Thereafter each mobile station constructs a header to the coded block it intends to send and transmits the coded data block and the header using certain uplink radio bursts, typically those bursts that were designated to it by the network. If FIG. 5 presents uplink aggregated coded data blocks, a first mobile station, for example, sends the coded block 501 (the first part of aggregated coded data block 500), a second mobile station sends the coded block 502 (the second part of aggregated coded data block 500), and a third mobile station sends both the aggregated coded data blocks 510 and 520.

In a method according to a second preferred embodiment of the invention, in downlink direction the number of radio bursts using which a data block is transmitted is selected from set of values. FIG. 6 presents a flowchart of a method for receiving downlink data according to this second preferred embodiment of the invention.

Let us assume that the MAC header of a coded data block is coded in a similar manner than in EGPRS. The coded MAC header is thus transmitted using one radio block.

If the number of radio bursts per one data block, for example a RLC block, is the same for each mobile station using a certain packet data channel, it is possible to signal this value to the mobile stations, for example, when a TBF is established. Let us first consider a case where the number of radio bursts per RLC block does not change dynamically nor between the TBFs using a certain packet data channel. In this case all mobile station using a certain downlink packet data channel knows the number of radio bursts using which a coded RLC block is transmitted.

The network codes and interleaves the RLC block for a certain user and transmits it using, for example, two radio bursts. One radio block carries thus two RLC blocks in EGPRS in a method according to this second preferred embodiment of the invention. It is possible that different coding methods are used for the blocks, and therefore the information about the coding of each RLC block must be available at least to the receiving mobile station.

The coding method can be indicated, for example, with the following methods. Usually the coding of an RLC block that is transmitted using four radio bursts is indicated with a certain string (called stealing bits, SB) in the coded MAC header. By adding or inserting more strings to the coded MAC header, for example, it is possible to indicate the coding methods in the coded data block itself.

Another way is to indicate the coding method implicitly. This can be done, because the coding method usually depends on the size of the MAC header. This MAC header is coded in a way that depends on the modulation scheme straightforwardly, and the actual transmitted data (for example, RLC block) is then coded with another coding scheme. A mobile station can determine the MAC header and the size of the MAC header without knowing the coding scheme that is used for the RLC block. The coding scheme used with each header size may be specified in standards, and therefore the mobile can determine the coding scheme of the RLC block(s) from the MAC header size.

A mobile station according to the invention collects the information carried by a radio block (step 601 in FIG. 6). Thereafter it determines the coding, for example, from a certain string in the coded MAC header (step 602). When the coding is know, it can uncode the RLC blocks transmitted using the radio block (step 603). Thereafter, in step 605, the mobile station determines the downlink (DL) identifiers in the RLC blocks. Typically there is one connection identifier is each RLC block. This connection identifier can be, for example the TFI. When knowing the TFIs, the mobile station can decide (step 606) whether the RLC block is intended for it.

A mobile station may be prepared to receive only one RLC block in a radio block. It may try to uncode the two consequent coded RLC block assuming that it is uncoding only one RLC block. The result is that the structure of the uncoded data is most probably not the structure of a RLC block, and the possibly used error checking codes indicate that some error has taken place in the transmission. This situation can be avoided by a suitable selection of stealing bits in the coded MAC header. The value of the string can be selected so that the a mobile station, who can receive or transmit only one RLC block per radio block, does not recognize the coding. Then it does not even try to uncode the data in that radio block.

FIG. 7a shows a schematic drawing of a coded RLC/MAC block 700 according to the second preferred embodiment of the invention. As in FIG. 4, the coded MAC header 701 is presented in a vertical direction. The USF field 702 of the MAC header is also presented in FIG. 7. FIG. 7 presents an example where the coded RLC/MAC block comprises two coded RLC blocks related to two different TFIs. The first coded RLC block is transmitted by the first two radio bursts of the radio block. The first burst carries a first part 703 of the coded information, and the second burst carries the second part 704. The second coded RLC block is transmitted similarly in two parts 705 and 706 using the last two radio bursts of the radio block. The coded information transmitted using the first two radio bursts (703, 704), i.e. the first coded RLC block, is the first part of the aggregated coded data block, corresponding to part 501 in FIG. 5. Correspondingly, the second coded RLC block is the second part of the aggregated coded data block.

Let us further consider that the number of radio bursts using which a coded RLC block is transmitted, can be dynamically chosen from a set of values. In this case, in a method according to the second preferred embodiment of the invention information about the number of coded RLC blocks carried by a certain coded RLC/MAC block and which radio bursts are allocated for each coded RLC block is stated in the MAC header of the coded RLC/MAC block. Because the MAC header is longer, the amount of coded RLC data that can be transmitted using a radio block may be in this case somewhat smaller than when the number of radio bursts per coded RLC block is known by the mobile stations a priori.

It is preferable that the size of the MAC header does not depend on how many coded RLC blocks the coded RLC/MAC block carries. One way is to place to each MAC header as many BId (Block Interleaving Downlink) indicators as there are radio bursts in the radio block. FIG. 7b presents a coded RLC/MAC block 710 where the MAC header 711 comprises the USF field 702 and four BId indicators 751, 752, 753 and 754. The use of BId indicators is explained below using examples.

Let us assume that the number of radio bursts per a RLC block can be 1, 2, 4 or 8. FIG. 7b presents an example where the coded RLC/MAC block carries three coded RLC blocks, and for the three coded RLC blocks 1, 2 and 1 radio bursts have been allocated, correspondingly. This is indicated with the BId indicators, and the values of the indicators are in this example BId1=1, BId2=2, BId3=2 and BId4=1. If for a certain RLC block eight radio bursts were allocated, the BId indicators would have a value corresponding to 8 radio bursts in two subsequent coded RLC/MAC blocks. The minimum length of the BId indicator in this example is two bits.

The coded RLC blocks are presented in FIG. 7b with horizontal rectangles. Rectangle 713 carries the first coded RLC block, which is related to a TBF identifier with value TFI3. Rectangles 714 and 715 carry a second coded RLC block, related to TBF identifier with value TFI4. Further, the rectangle 716 carries the third coded RLC block, related to a TBF identifier with value TFI5.

The method 600 for receiving downlink coded data blocks works also in a situation, where the number of coded RLC blocks and the number of radio bursts allocated for each RLC block is stated in the coded RLC/MAC block. Let us use the BId indicators as an example. In FIG. 6, the BId indicators are determined in step 603. Thereafter the mobile station can infer the number of radio bursts per coded RLC block. Each coded RLC block is uncoded in step 604.

FIG. 8 presents a flowchart of a method for transmitting coded downlink data blocks according to the second preferred embodiment of the invention. In step 801 the network constructs a data block, for example a RLC block, that is to be sent to a mobile station. The receiving mobile station is identified with a connection identifier, for example with the TFI, in the data block. In step 802 the number of radio bursts allocated for the data block is selected, for example based on the quality of service requirements or based on the transmission error probability. Thereafter the coding method is selected in step 803. It is also possible that the coding method is selected first, and the choice of coding method dictates the number of radio bursts.

The data block, for example a RLC block, is coded in step 804. In step 805 the network aggregates a suitable number of coded data blocks to a coded RLC/MAC block. A proper MAC header is added to the coded data block (step 806). The MAC header may comprise, for example, the BId indicators and possible bit strings indicating the coding of each RLC block. In step 801 the aggregated coded data block is transmitted using a radio block.

In a method according to a third preferred embodiment of the invention, the number of radio bursts per a RLC block can be varied in the uplink direction. Let us first discuss the allocation of uplink radio bursts to the mobile station sharing the uplink packet data channel. To achieve backwards compatibility, it is necessary to keep an uplink identifier, in EGPRS the USF field, in the MAC header. In a method according to the third preferred embodiment of the invention, an uplink subidentifier is introduced. Some values of the uplink identifier are reserved for transmitting data using whole radio blocks. The rest of the values of the uplink identifier are used to indicate groups of mobile stations that can transmit coded data blocks using a varying number of radio bursts. The uplink subidentifier is then used to indicate a certain mobile station within the group which the uplink identifier indicates. An uplink identifier and an uplink subidentifier is given to each mobile station that is aiming to transmit coded data block using a varying number of radio blocks.

FIG. 7c presents an example of uplink identifiers (USF) and uplink subidentifiers (extUSF). The value of USF in the coded RLC/MAC block 720 is such that it refers to a group of mobile stations. The length of the extUSF identifiers may be, for example, two bits and there may be up to four mobile stations in the group a certain USF value specifies. The example values of extUSF indicators in FIG. 6c designate the first two radio bursts of the next uplink radio block to the mobile station having USF=5 and extUSF=1. The third radio burst in the next uplink radio block is designated to a mobile station having USF=5 and extUSF=2, and the fourth radio burst is designated to a mobile station having USF=5 and extUSF=3. Similarly as in the case of BId indicators, it is preferable that there is a fixed number of extUSF identifiers in a downlink coded RLC/MAC block. This way the MAC header has a fixed size.

The actual coded RLC blocks of the coded RLC/MAC block 720 are related to TBFs having identifiers TFI6 (rectangles 723, 724) and TFI7 (rectangles 725, 726). It is assumed that in the downlink direction the number of radio bursts per coded RLC block is two, similarly as in the example presented in FIG. 6a.

The size of the MAC header increases if a coded RLC/MAC block carries uplink subidentifiers, such as extUSFs. Even if the RLC/MAC block 720 carried only one coded RLC block (i.e. rectangles 723–726 each carry a part of the coded RLC block), a mobile station that is able to receive only one coded data block per radio block would probably not be able to uncode the RLC block. This is because it incorrectly assumes that the extUSF indicators are part of the coded RLC block. Downlink coded RLC/MAC blocks that contain uplink subidentifiers should carry coded RLC/MAC blocks only to mobile stations that can receive RLC/MAC blocks according to the invention.

FIG. 7d presents a second example of uplink identifiers (USF) and uplink subidentifiers (extUSF). In FIG. 7d, three radio bursts of the next uplink radio block are designated to the mobile station having USF=5 and extUSF=1. If, in this example, it is possible to transmit a RLC block using 1, 2, 4 or 8 radio bursts, then the mobile can transmit two or three RLC blocks in the next uplink radio block. If two RLC blocks are transmitted, then one of the RLC blocks can be coded and interleaved in such a way that the coded RLC block can be transmitted using two radio bursts, and the other RLC block can be coded and interleaved in such a way that the coded RLC block can be transmitted using one radio burst. If three RLC blocks are transmitted, they can be processed all in the same way.

The problem is that the network has to know how the RLC blocks were processed so that it can uncode them. One solution to this vagueness is to add to the coded downlink RLC/MAC block indicators, with which the network specifies how the mobile station must process and transmit the RLC blocks. In FIG. 7d the coded RLC/MAC block 730 comprises also BIu (Block Interleaving uplink) indicators 771, 772, 773 and 774. In the example in FIG. 7d, the mobile station (specified by USF=5, extUSF=1) is expected to transmit two coded RLC blocks. The first of these is expected to be transmitted using one radio burst, and the second RLC block using two radio bursts.

If two sequential uplink radio blocks are designated to a mobile station, it is possible to code and interleave one RLC block over eight radio bursts. In this example, the USF and extUSF identifiers have a certain value in two sequential coded downlink RLC/MAC blocks, and all BIu indicators in these coded downlink RLC/MAC blocks have the value corresponding to eight radio bursts. If coded RLC blocks on a certain packet data channel are transmitted using fixed mobile-station-dependent numbers of radio bursts, then it is not necessary to transmit BIu indicators to the mobile stations in coded RLC/MAC blocks. This is especially true, if all coded data blocks on a certain data channel are transmitted using a certain number of radio bursts.

If only the mobile station to whom a downlink coded RLC block is intended knows the number of radio bursts using which the coded RLC block is sent, the following may happen. A mobile station expecting the coded RLC blocks to be transmitted using, for example, one radio burst cannot uncode coded RLC block transmitted using, for example, two radio bursts. The resulting uncoded data most probably does not have the structure of a RLC block, and the mobile station has to decide whether a transmission error occurred or whether the coded RLC block was not intended for it. This decision can be made, for example, with the help of a check sum that the network calculates over the coded RLC blocks in a RLC/MAC block and places in the MAC header.

FIG. 9 presents the flowchart of a method for determining the allocation of an up-link packet data channel according to the third preferred embodiment of the invention. Using this method a mobile station can determine, if it is its turn to transmit data over the uplink packet data channel. A mobile station may be given only the uplink identifier, for example USF, or both the uplink identifier and the uplink subidentifier, for example extUSF (step 901).

In step 902 the mobile station receives a coded data block, for example a coded RLC/MAC block, transmitted using a radio block. Thereafter it determines the uplink (UL) identifier in the coded MAC header (step 903). In step 904 the mobile station checks if it has a UL subidentifier.

If the mobile station does not have a subidentifier, it checks if the UL identifier in the coded downlink data block is equal to its UL identifier (step 905). If it is, then the mobile station knows the next uplink radio block is designed to it (step 906). If it is not, then the mobile station has to wait for the next downlink radio block related to the packet data channel. If a mobile station can transmit and receive only coded data that is transmitted using whole radio blocks, it has not been given an UL subidentifier. Therefore it uses only the steps 901–906 of the flowchart.

If the mobile station has a subidentifier, it first checks if the UL identifier in the coded downlink data block is equal to its UL identifier (step 907). If it is not equal, no radio bursts in the next uplink radio block are designated for the mobile station and it has to wait for the next coded downlink data block. If it is equal, then the mobile station determines the UL subidentifiers in the received coded data block (step 908).

If none of the UL subidentifiers in the coded data block is not equal to the mobile station's subidentifier, then the mobile station waits for the next coded data block. If at least some of the UL subidentifiers are equal to the mobile station's UL subidentifier, then it determines the number of radio bursts designated to it and determines the interleaving lengths (step 910). The interleaving lengths can be determined, for example, using BIu indicators or using signaling information.

In step 911 the mobile station codes and interleaves the data block or data blocks it is allowed to send in the next uplink radio block. In step 912 is transmits the coded data blocks using the radio bursts that have been designated to it.

The flowchart in FIG. 10 presents a method 1000 for transmitting coded downlink data blocks according to the third preferred embodiment of the invention. The method 1000 starts with similar step 801–805 as the method 800. These steps are related to the information that is transmitted in the downlink direction. In step 1001 the network divides the radio bursts in the next uplink radio blocks to certain group of mobile stations. The group of mobile stations is defined with an UL identifier and the individual mobile station within the group with an UL subidentifier. In step 1002 the number of radio bursts per each data block is selected. This can be indicated, for example, with BIu indicators.

In step 1003 a MAC header that comprises the necessary UL identifier and UL subidentifiers and possible BIu indicators is constructed. In step 807 and 808 the MAC header is added to the aggregated coded data block and transmitted to mobile stations.

When a mobile station transmits packet data in the uplink direction, it may use a method similar to the method 1000. It first constructs the data block it intends to send. Thereafter is figures out the number of radio bursts the network has allocated to it using the method 900, for example. It further detects the information about the interleaving, for example the BIu indicators. It selects a suitable coding and interleaving method and thereafter transmits the coded data block using those radio bursts in the uplink radio block that were designated to it.

If the uplink packet data channel is allocated to the users with some other means than by using uplink identifiers and subidentifiers, it is still possible to use the bursts-by-burst allocation according to the invention in the uplink direction. Irrespective of how a mobile stations knows/decides when to transmit packet data, each mobile station may use a varying number of radio bursts when transmitting a data block. The connection identifier in the data block will tell the network which mobile station sent the data block.

If the network informs the mobile stations of their turns to use the uplink packet data channel, the network knows which mobile station is transmitting data and how many radio bursts is uses a coded data block. Therefore it is not necessary to carry information about the number of radio bursts per coded uplink block in the uplink coded block itself. The MAC header of the uplink coded block may change, however, compared to the current EGPRS specification, because when a mobile station is transmitting a coded RLC/MAC block using a whole radio block it can code the MAC header over the whole radio block. When the uplink radio bursts are designated on a burst-by-burst basis, it is probably more preferable to code the MAC header over the same number of radio bursts that is used to transmit a coded RLC/MAC block.

In a method according to a fourth preferred embodiment of the invention, the number of radio bursts per a coded data block can be varied in both uplink and downlink directions. In this case the network may use the method 1000 when transmitting the downlink coded data blocks and information about the designation of the uplink radio bursts. The mobile station, on the other hand, may use methods 600 and 900 simultaneously. It can, for example, uncode the information in the coded downlink data block before returning back to step 902, i.e. after step 905, 906, 907, 909 or 912.

FIG. 7e presents an example of a coded data block according to the fourth preferred embodiment of the invention. This coded RLC/MAC data block 740 comprises in the MAC header 741 identifiers and indicators related to both uplink and downlink radio bursts. It may be wiser to use a fixed number of radio bursts per a coded RLC block, for example allocate always two sequential uplink or downlink radio bursts to one mobile stations (i.e. corresponding to a situation where BId=2 and BIu=2). This way the BId and BIu indicators are not needed in the MAC header. The values of the indicators may be signaled to the mobile stations using the packet data channel when the TBF is established, for example.

In a method according to any preferred embodiment of the invention it is possible to uses burst-by-burst allocation of radio bursts and block-by-block allocation of radio bursts. In the downlink direction, for example, coded packet data can be transmitted using coded RLC/MAC blocks 400 and 720. RLC/MAC blocks 720 carry downlink information to mobile stations that can receive coded data block transmitted using a varying number of radio bursts. They can contain up to four RLC blocks for various mobile stations in EGPRS. RLC/MAC block 400, on the other hand, can transmit data to all mobile stations, but it carries only one RLC block at a time.

The uplink radio bursts can be designated on a block-by-block basis (using a suitable value of the UL identifier) or an a burst-by-burst basis (using suitable values of the UL identifier and the UL subidentifier). A RLC/MAC block 400 can carry only an UL identifier, and this identifier should not refer to a group of mobile stations. A RLC/MAC block 720 may carry both the UL identifier and UL subidentifier. The UL identifier in a RLC/MAC block 720 may refer to a single mobile station, in which case the UL subidentifier values are meaningless and the whole next uplink radio block is allocated for the mobile station having the UL identifier. The UL identifier is a RLC/MAC block 720 may also refer to a group of mobile stations, in which case the UL subidentifiers indicate the allocation of the uplink radio bursts to the mobile stations belonging to the group.

Here is an example of mixing block-by-block and burst-by-burst allocation. There are three users (mobile stations) using the same packet data channel and modulation is 8PSK. Mobile station A having USF=1 wishes to use whole radio blocks in both uplink and downlink directions, for example every other radio block is allocated to mobile station A. Mobile stations B (USF=2, extUSF=1) and C (USF=2, extUSF=2) wish to use each two radio bursts of every other uplink and downlink radio blocks.

Downlink data to mobile station A may be transmitted using RLC/MAC blocks 400 which each carry one RLC block to mobile station A. In these the USF field may be set to 1. Downlink data to mobile stations B and C may be transmitted using RLC/MAC blocks 720, which each carry two coded RLC blocks (one for mobile station B and one for mobile station C). In the RLC/MAC blocks 720 the USF fields is 2 and the four extUSF fields have values 1, 1, 2 and 2. In this example, in the downlink direction every other RLC/MAC block is a RLC/MAC block 400 and every other is a RLC/MAC block 720.

Table 1 below gives an example of coding of the extUSF identifier. In this example the extUSF is two bits long. The possible values of the extUSF are represented in the leftmost column of the table. In Table 1 b1, b2, b3 and b4 refer to the burst number in a radio block that contains four radio bursts. As can be seen from the table, the coding suggested in Table 1 depends only on the modulation which is used. In EGPRS either GMSK or 8-PSK is used. The possible BId and BIu indicators can be coded similarly, if their length is also 2 bits.

TABLE 1

Coding of extUSF

| extUSF | GMSK | | | | 8PSK | | | |
| --- | --- | --- | --- | --- | --- | --- | --- | --- |
|  | b1 | b2 | b3 | b4 | b1 | b2 | b3 | b4 |
| 00 | 00 | 00 | 00 | 11 | 010100 | 110000 | 111100 | 000011 |
| 01 | 00 | 11 | 11 | 01 | 001111 | 101011 | 100000 | 111101 |
| 10 | 11 | 00 | 11 | 00 | 100010 | 000110 | 001111 | 001100 |
| 11 | 11 | 11 | 00 | 10 | 111001 | 011101 | 010011 | 110010 |

FIG. 11 presents a mobile station 1110 according to the invention. In the mobile station 1110 comprises a block 1112 responsible for selecting the number of radio bursts using which a certain data block is transmitted. The selection of bursts in block 1112 may happen by detecting which uplink radio bursts the network has designated for the mobile station, for example by using the USF and ext USF fields in a MAC header of a RLC/MAC block. It may also select the number of radio bursts and the radio bursts according to some other media access protocol or independently. The mobile station further comprises a mapping block 1113 which maps the data block to the available bursts, for example performing a suitable coding. Thereafter the transceiver block 114 transmits the radio bursts which carry information related to the data block. The communication block 1111 is responsible for communication with upper protocol layers, and the data block which is to be transmitted is usually received from upper layer protocols.

When receiving data, the radio bursts are received in the mobile station using the transceiver 114. Detection block 1115 is responsible for detecting the radio bursts and the number of radio bursts that are related to a certain data block. This can be done, for example, with the help of TFI and BIu, as discussed above. In construction block 1116 the data block is constructed, for example the data carried with a certain number of radio bursts is uncoded. Thereafter the data block is supplied to the upper protocol layers.

The blocks 1112, 1113, 1115 and 1116 are usually part of the second and third protocol layers. They can be implemented, for example, using processors and suitable software. The mobile station 1110 may support any method according to the invention.

The arrangement 1120 according to the invention has similar block as a mobile station 1110 according to the invention. It has a communication block 1121 for communication with upper protocol layers and selection block 1122 for selecting the number of radio bursts per data block, for example, based on the amount of transmission errors. These blocks are typically situated in a controlling network element 1140, for example in a Packet Control Unit (PCU) of the (E)GPRS system. The mapping of data block to radio bursts (block 1123) is usually also done in the PCU.

The transceiver 1124 is in the base station 1130, and when the radio bursts are received, the entity responsible of constructing the data block (in block 1126, usually this block resides in the PCU) needs to know the number of radio bursts used to transmit the block. The number can be detected in block 1125, for example, from the header of the data block, but it can also be known a priori. If the network designates the uplink radio bursts to the mobile stations, it may assume that the uplink data it receives is transmitted by the mobile stations according to the designation.

The blocks within the arrangement 1120 according to the invention may also be divided in a different way among the network elements. It is also possible that the whole arrangement is implemented in one network element. The arrangement or network elements according to the invention may support, for example, any method according to the preferred embodiments of the invention discussed above.

The term "cellular system" refers generally to any telecommunications system which enables a wireless communication connection between a mobile station and the fixed parts of the system when the user of the mobile station is moving within the service area of the system. The majority of mobile telecommunications systems in use at the time of the filing of this patent application belong to the second generation of such systems, a well-known example being the GSM system. However, the invention also applies to the next or third generation of mobile telecommunications systems, such as a system known as the UMTS (Universal Mobile Telecommunications System) which currently undergoes standardization.

EGPRS is used as an example of a system where a method according to the invention can be implemented. The methods according to the invention are not restricted to those used in EGPRS or in GPRS; a method according to the invention can be applied also in other wireless packet data networks.

What is claimed is:

1. Method for transmitting data on a packet data channel in a transmission system having a plurality of radio frames, each frame having a plurality of sequential time slots, said method comprising:
   forming the packet data channel by a number of radio bursts in certain time slots in a certain sequence of radio frames, said certain time slots having the same time slot number and each of said time slots relating to one burst,
   transmitting data in data blocks,
   using the packet data channel by a number of packet data connections,
   using an identifier in each data block to indicate a connection to which the data block is related, and
   selecting the number of radio bursts used to transmit a data block of a packet data connection belonging to said number of packet data connections on said packet data channel from a certain set of values, which set contains at least two values.

2. Method according to claim 1, further comprising:
   coding each of said data blocks before transmission,
   aggregating the resulting coded data blocks to at least one aggregated coded data block, in which aggregated coded data blocks comprise at least one part, a number of parts of the at least one part being complete coded data blocks and a number of other parts of the at least one part being partial coded data blocks, and
   transmitting each part within an aggregated coded data block by using a part-specific number of radio bursts in such a way that a sum of part-specific numbers within the aggregated coded data block is a certain predetermined number.

3. Method according to claim 2, wherein a number of aggregated coded data blocks contain only one part, which is a complete coded data block.

4. Method according to claim 2, wherein an aggregated coded data block containing a part, which is a partial coded data block, contains only said part.

5. Method according to claim 2, wherein the method, in which a certain data block is coded, is selected based on the number of radio bursts selected for said data block.

6. Method according to claim 2, wherein the number of radio bursts for transmitting a data block is selected based on the method in which said data block is coded.

7. Method according to claim 2, wherein
the number of radio bursts for transmitting a data block is selected for each packet data channel, and
all data blocks transmitted on a packet data channel are transmitted using a selected packet data channel specific number of radio bursts.

8. Method according to claim 2, wherein the number of radio bursts for transmitting a data block is selected separately for each data block.

9. Method according to claim 2, further comprising:
constructing a header for each aggregated coded data block, and
transmitting the header of the aggregated coded data block using the same radio bursts as the aggregated coded data block.

10. Method according to claim 2, further comprising:
constructing a header for each part within an aggregated coded data block, and
transmitting each header using the same radio bursts as the part related to it.

11. Method according to claim 2 further comprising communicating an allocation of the number of radio bursts, in which a part of the aggregated coded data block is transmitted, at least to a mobile station related to the connection indicated in the data block in the part.

12. Method according to claim 11, wherein the allocation of the number of radio bursts is signaled to the mobile station using a signaling channel different from the packet data channel.

13. Method according to claim 11, further comprising:
constructing a header for an aggregated coded data block, and
transmitting the header of an aggregated coded data block using the same radio bursts as the aggregated coded data block,
wherein the allocation of the number of radio bursts is communicated to the mobile station together with said header.

14. Method according to claim 13, wherein a number of downlink radio bursts used to transmit a part within an aggregated coded data block is indicated for each part of said aggregated coded data block in said header of said aggregated coded data block.

15. Method according to claim 13, wherein an allocation of a number of uplink radio bursts is communicated to the mobile station together with said header of a downlink aggregated coded data block.

16. Method according to claim 15, further comprising:
allocating the number of uplink radio bursts to mobile stations using second identifiers and third identifiers,
reserving certain first values of the second identifier to allocate a predetermined number of uplink radio bursts to a certain mobile station,
reserving certain second values of the second identifier, which are different from the first values, to designate said predetermined number of uplink bursts to a certain group of mobile stations, and
indicating the mobile station related to certain uplink radio bursts within said predetermined number of uplink radio bursts with said third identifiers.

17. Method according to claim 16, wherein the number of uplink radio bursts, in which a part of an uplink aggregated coded data block is transmitted, is indicated for each part of said uplink aggregated coded data block in said header of a downlink aggregated coded data block.

18. Method according to claim 17, wherein the number of downlink radio bursts used to transmit a part of said downlink aggregated coded data block is indicated for each part of said downlink aggregated coded data block in said header of said downlink aggregated coded data block.

19. A mobile station for transmitting data on a packet data channel in a transmission system having a plurality of radio frames, each frame having a plurality of sequential time slots, the packet data channel formed by a number of radio bursts in a certain sequence of radio frames, said certain time slots having the same time slot number and each of said certain time slots relating to one burst, the packet data channel used by a number of packet data connections to transmit data in data blocks, said mobile station comprising:
means for transmitting uplink data blocks, means for receiving downlink data blocks,
means for detecting the number of downlink radio bursts in which a downlink data block is transmitted, and
means for dynamically selecting the number of uplink radio bursts in which an uplink data block of a packet data connection belonging to said number of packet data connections on said packet data channel is transmitted, wherein the number of uplink radio bursts is selected from a certain set of values, which set contains at least two values.

20. Mobile station according to claim 19, wherein the means for selecting the number of uplink radio bursts are means for selecting the number of uplink radio bursts as indicated by a cellular radio system.

21. Mobile station according to claim 19, wherein the means for selecting the number of uplink radio bursts are means for selecting the number of uplink radio bursts independently.

22. Mobile station according to claim 19, said mobile station being a mobile station of the EGPRS system.

23. An arrangement for transmitting data on a packet data channel in a transmission system having a plurality of radio frames, each frame having a plurality of sequential time slots, the packet data channel formed by a number of radio bursts in certain time slots in a certain sequence of radio frames, said certain time slots having the same time slot number and each of said same certain time slots relating to one burst, the packet data channel used by a number of packet data connections to transmit data in data blocks, said arrangement comprising:
means for transmitting downlink data blocks,
means for receiving uplink data blocks, and
means for dynamically selecting the number of downlink radio bursts in which a downlink data block of a packet data connection belonging to said number of packet data connections on said packet data channel is transmitted, wherein the number of downlink radio bursts is selected from a certain set of values, which set contains at least two values.

24. An arrangement according to claim 23, further comprising means for selecting the number of uplink radio bursts in which an uplink data block is transmitted.

25. A network element for transmitting data on a packet data channel in a transmission system having a plurality of radio frames, each frame having a plurality of sequential time slots, the packet data channels formed by a number of radio bursts in certain time slots in a certain sequence of radio frames, said certain time slots having the same time slot number and each of said certain time slots relating to one burst, the packet channel used by a number of packet data connections to transmit data in data blocks, said element comprising:

means for dynamically selecting the number of downlink radio bursts in which a downlink data block of a packet data connection belonging to said number of packet data connections on said packet data channel is transmitted, wherein the number of downlink radio bursts is selected from a certain set of values, which set contains at least two values, and means for selecting the number of uplink radio bursts in which an uplink data block of a packet data connection belonging to said number of packet data connections on said packet data channel is transmitted, wherein the number of uplink radio bursts is selected from a certain set of values, which set contains at least two values.

26. Network element according to claim 25, said network element being a packet control unit of an EGPRS system.

27. Method for transmitting data on a packet data channel in a transmission system having a plurality of radio frames, each frame having a plurality of sequential time slots, said method comprising:

forming the packet data channel by a number of radio bursts in certain time slots in a certain sequence of radio frames, said certain time slots having the same time slot number and each of said certain time slots relating to one burst, transmitting data in data blocks, using the packet data channel by a number of packet data connections, using an identifier in each data block to indicate the connection to which the data block is related, selecting the number of radio bursts used to transmit a data block of a packet data connection belonging to said number of packet data connections on said packet data channel from a certain set of values, which set contains at least two values, coding each of said data blocks before transmission, aggregating the resulting coded data blocks to at least one aggregated coded data block, in which aggregated coded data blocks comprise at least one part, a number of parts of the at least one part being complete coded data blocks and a number of other parts of the at least one part being partial coded data blocks, and transmitting each part within an aggregated coded data block by using a part-specific number of radio bursts in such a way that a sum of part-specific numbers within the aggregated coded data block is a certain predetermined number, communicating an allocation of the number of radio bursts, in which a part of the aggregated coded data block is transmitted, at least to a mobile station related to the connection indicated in the data block in the part, constructing a header for an aggregated coded data block, and transmitting the header of an aggregated coded data block using the same radio bursts as the aggregated coded data block, wherein the allocation of the number of radio bursts is communicated to the mobile station together with said header, and an allocation of a number of uplink radio bursts is communicated to the mobile station together with said header of a downlink aggregated coded data block, and further comprising:

allocating the number of uplink radio bursts to mobile stations using second identifiers and third identifiers, reserving certain first values of the second identifier to allocate a predetermined number of uplink radio bursts to a certain mobile station, reserving certain second values of the second identifier, which are different from the first values, to designate said predetermined number of uplink bursts to a certain group of mobile stations, and indicating the mobile station related to certain uplink radio bursts within said predetermined number of uplink radio bursts with said third identifiers.

* * * * *